US012739716B2

(12) United States Patent
Koizumi et al.

(10) Patent No.: US 12,739,716 B2
(45) Date of Patent: Sep. 15, 2026

(54) WIRELESS COMMUNICATION DEVICE, TRANSMISSION TERMINAL, AND WIRELESS COMMUNICATION SYSTEM

(71) Applicant: 1FINITY Inc., Kawasaki (JP)

(72) Inventors: Ryo Koizumi, Yokohama (JP); Tsuyoshi Shimomura, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 292 days.

(21) Appl. No.: 18/425,021

(22) Filed: Jan. 29, 2024

(65) Prior Publication Data

US 2024/0172071 A1 May 23, 2024

Related U.S. Application Data

(63) Continuation of application No. PCT/JP2021/029226, filed on Aug. 5, 2021.

(51) Int. Cl.
*H04W 36/06* (2009.01)
*H04L 5/00* (2006.01)
*H04W 74/0833* (2024.01)

(52) U.S. Cl.
CPC .......... *H04W 36/06* (2013.01); *H04L 5/0005* (2013.01); *H04W 74/0841* (2013.01)

(58) Field of Classification Search
CPC . H04W 36/06; H04W 74/0841; H04W 72/25; H04W 72/02; H04W 92/18; H04L 5/0005
See application file for complete search history.

(56) References Cited

U.S. PATENT DOCUMENTS

2016/0013861 A1* 1/2016 Ceccarelli .......... H04J 14/0258 398/25
2021/0160821 A1 5/2021 Lin et al.
2021/0368480 A1 11/2021 Chen et al.
2023/0103205 A1* 3/2023 Guo .................... H04W 72/21 370/329

FOREIGN PATENT DOCUMENTS

WO 2020/166032 A1 8/2020
WO 2020/217501 A1 10/2020

OTHER PUBLICATIONS

Notice of Reasons for Refusal issued by the Japan Patent Office for corresponding Japanese Patent Application No. 2023-539519, dated Dec. 24, 2024, with an English translation.

(Continued)

*Primary Examiner* — Charles C Jiang
(74) *Attorney, Agent, or Firm* — Myers Wolin, LLC

(57) ABSTRACT

A wireless communication device includes a wireless communicator configured to perform wireless communication with a plurality of transmission terminals, and processor circuitry is further configured to determine whether a conflict occurs in wireless resources reserved by the transmission terminals to be used for data transmission, and determine, when it is determined that a conflict of the wireless resources occurs, for transmitting information that indicates the conflict of the wireless resources.

9 Claims, 8 Drawing Sheets

(56) References Cited

OTHER PUBLICATIONS

International Search Report with the Written Opinion of the International Searching Authority issued by the Japan Patent Office for corresponding International Patent Application No. PCT/JP2021/029226, mailed on Nov. 2, 2021, with a partial English translation.
Ericsson, "Mode 2 enhancements using Inter-UE coordination", Agenda Item: 8.11.1.2, 3GPP TSG RAN WG1 #104b-e, R1-2103705, e-Meeting, Apr. 12-20, 2021.
Lenovo et al., "Discussion on inter-UE coordination for Mode 2 enhancements", Agenda Item: 8.11.1.2, 3GPP TSG RAN WG1 #105-e, R1-2104870, e-Meeting, May 10-27, 2021.
CATT, "Remaining issues on Mode 2 resource allocations in NR V2X", Agenda Item: 7.2.4.2.2, 3GPPTSG RAN WG1 #100, R1-2000522, e-Meeting, Feb. 24-Mar. 6, 2020.
Moderator (Intel Corporation), Outcome of [100b-e NR-5G_V2X_NRSL-Mode-2-02], Agenda Item: 7.2.4.2.2, 3GPP TSG RAN WG1 Meeting #100bis-E, R1-2003036, e-Meeting, Apr. 20-30, 2020.

* cited by examiner

WIRELESS COMMUNICATION DEVICE, TRANSMISSION TERMINAL, AND WIRELESS COMMUNICATION SYSTEM

CROSS-REFERENCE TO RELATED APPLICATION

This application is a continuation of International Application No. PCT/JP2021/029226, filed on Aug. 5, 2021, the entire contents of which are incorporated herein by reference.

FIELD

The embodiments discussed herein are related to a wireless communication device, a wireless communication system, and a communication control method.

BACKGROUND

In today's networks, traffic of mobile terminals (smartphones and feature phones) occupies the majority of network resources. Furthermore, the traffic used by mobile terminals will continue to grow.

On the other hand, as Internet of Things (IoT) services (for example, transportation systems, smart meters, and device monitoring systems) are deployed, there is a need to deal with services with diverse requirements. Therefore, in addition to the standard technologies of the 4th generation mobile communications (4G), there is a need for technologies to achieve even higher data rates, larger capacity, and lower latency with the communication standards for the 5th generation mobile communications (5G or New Radio (NR)).

In order to deal with a wide variety of services, it is assumed with 5G to support a number of use cases classified as Enhanced Mobile Broad Band (eMBB), Massive Machine Type Communications (MTC), and Ultra-Reliable and Low Latency Communication (URLLC).

Furthermore, the 3GPP working group is also discussing New Radio Vehicle to Everything (NR-V2X) communications. NR-V2X is a general term for Vehicle to Vehicle (V2V) performing communication between vehicles, Vehicle to Pedestrian (V2P) performing communication between a vehicle and a pedestrian, Vehicle to Infrastructure (V2I) performing communication between a vehicle and road infrastructure such as a sign, Vehicle to Network (V2N) performing communication between a vehicle and a network, and the like using sidelink interface, for example.

Regarding the allocation of wireless resources (hereinafter, simply referred to as "resources") in NR-V2X, it is considered to provide a control channel (Physical Sidelink Control CHannel: PSCCH) and a data channel (Physical Sidelink Shared CHannel: PSSCH). Sidelink Control Information (SCI) that contains, for example, information regarding the modulation scheme and coding rate of the data on the corresponding PSSCH, and the like, is mapped to the PSCCH resources.

When executing NR-V2X mode 2 in which the terminal device autonomously selects a resource to be used for data transmission, SCI is also used to notify the resource reserved by the terminal device. In other words, upon selecting a resource to be used for data transmission, the terminal device transmitting data maps the SCI for reserving the resource to the PSCCH and transmits it. Therefore, other terminal devices receive the SCI to know the reserved resource, and when the other terminal devices themselves transmit data, they select resources for data transmission by excluding the reserved resource. The related technologies are described, for example, in: International Publication Pamphlet No. WO 2020/166032; International Publication Pamphlet No. WO 2020/217501; and Ericsson, "Mode 2 enhancements using Inter-UE coordination", 3GPP TSG RAN WG1 #104b-e, R1-2103705, April 12th-20th, 2021.

SUMMARY

According to an aspect of an embodiment, a wireless communication device includes a wireless communicator configured to perform wireless communication with a plurality of transmission terminals; and a processor is further configured to determine whether a conflict occurs in wireless resources reserved by the transmission terminals to be used for data transmission, and determine, when it is determined that a conflict of the wireless resources occurs, for transmitting information that indicates the conflict of the wireless resources.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

By the way, when each of a plurality of terminal devices selects resources autonomously, a conflict may occur in the reserved resources of the terminal devices depending on the timing at which each of the terminal devices transmits SCI. Specifically, in a case where two terminal devices select overlapping resources almost simultaneously and transmit SCI to inform the reserved resources, a conflict of the reserved resources occurs between the two terminal devices.

Thus, when a terminal device that receives SCI from the two terminal devices detects the conflict of the reserved resources, it is considered to avoid the conflict of the reserved resources by requesting reselection of the resources to the terminal devices from which the SCI is transmitted. As described, the terminal device coordinating with the terminal devices transmitting data avoids the conflict of the reserved resources, thereby making it possible to improve the communication efficiency of the entire system.

However, in an environment where resources are congested, for example, the conflict of reserved resources is frequently detected and a large number of resource reselections occur. Thus, it is also possible that conflict avoidance does not function sufficiently. That is, when a large number of terminal devices share resources and NR-V2X mode 2 is executed, for example, a conflict of reserved resources occurs frequently and many terminal devices are requested to reselect resources. As a result, the possibility of having re-conflict where the reselected resource overlaps with reserved resource of other terminal devices increases, so that the communication efficiency is not sufficiently improved.

Furthermore, when a plurality of terminal devices detect a conflict of reserved resources, those terminal devices may request reselection of the resources to different terminal devices from each other. This may cause unnecessary reselection of the resources. That is, when a conflict of reserved resources occurs between two terminal devices, for example, a plurality of terminal devices may coordinate with the two terminal devices and request reselection of the resources to both of the two terminal devices. In such cases, as a result of unnecessary reselection of the resources, each thereof may have a possibility of re-conflicting with the reserved resource of the other device. Thus, the communication efficiency is not sufficiently improved.

Preferred embodiments will be explained with reference to accompanying drawings. Note that the present disclosure is not limited by the embodiments.

(a) First Embodiment

Figure 1:
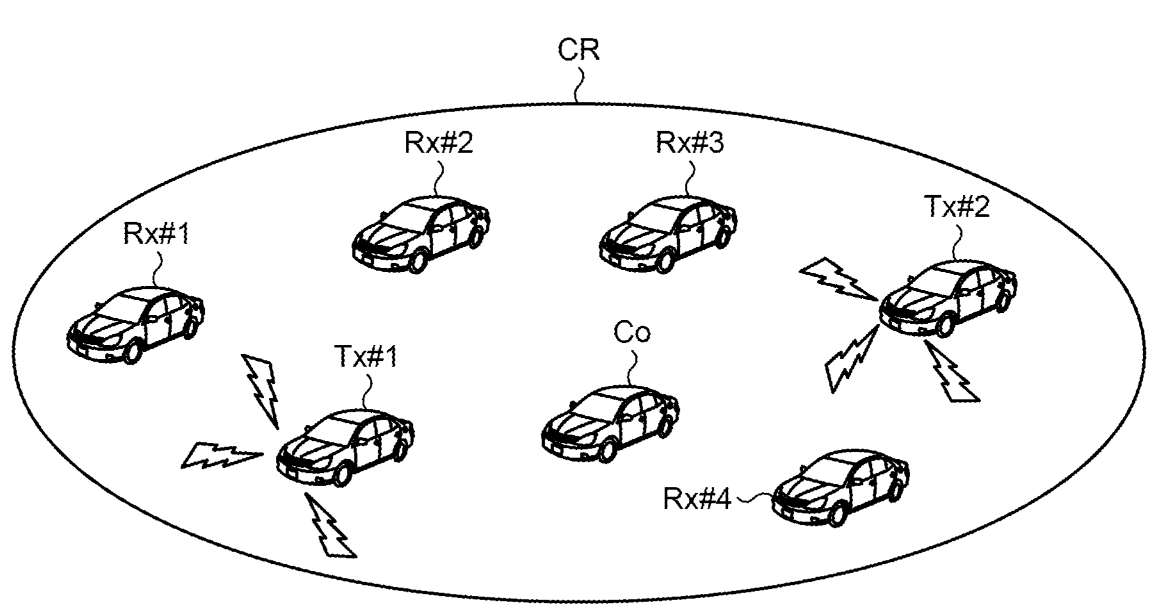
FIG. 1 is a diagram illustrating a specific example of a wireless communication system according to a first embodiment.

FIG. 1 is a diagram illustrating a specific example of the wireless communication system according to a first embodiment. As illustrated in FIG. 1, for example, each of a plurality of terminal devices loaded on a vehicle forms a group with other terminal devices located within a communication range (CR) from the own device, and executes groupcasting within the group. In other words, each of the terminal devices transmits signals to the other terminal devices within the respective communication range CR, and receives signals from other terminal devices within the respective communication range CR. The terminal device may also establish a unicast link with a specific terminal device, and execute unicasting where one-to-one communication is performed via the unicast link. In addition, the terminal device may execute broadcasting where the destination terminal device is not specified.

FIG. 1 illustrates transmission terminals Tx #1 and #2 that transmit signals, reception terminals Rx #1 to #4 that receive signals, and a coordinative terminal Co that receives signals and coordinates with the transmission terminals Tx #1 and #2. Since the transmission terminals Tx #1 and #2, the reception terminals Rx #1 to #4, and the coordinative terminal Co are all equivalent terminal devices, the transmission terminals Tx #1 and #2 can also be the reception terminals that receive signals from the other terminal devices, and the reception terminals Rx #1 to #4 and the coordinative terminal Co can be the transmission terminals that transmit signals to the other terminal devices as well. Furthermore, all terminal devices other than the transmission terminals Tx #1 and #2 may also be the coordinative terminals.

When data to be transmitted is generated, the transmission terminals Tx #1 and #2 select resources to be used for data transmission based on SCI already received from the other terminal device. In other words, the transmission terminals Tx #1 and #2 specify the resource reserved by the other terminal device (reserved resource) from the SCI already received from the other terminal device, and select a resource in areas not overlapping with the reserved resource in time and frequency. Then, the transmission terminals Tx #1 and #2 generate SCI to notify the selected resource as a reserved resource for the own terminal, and transmit it to the terminal devices within a group. Then, the transmission terminals Tx #1 and #2 transmit data by using the selected reserved resources.

Furthermore, when a resource reselection request is received from the coordinative terminal Co, the transmission terminals Tx #1 and #2 select a resource that does not overlap with the reserved resource of the other terminal device and is different from the previously selected reserved resource. Since there is a reselection request received from the coordinative terminal Co when a conflict occurs between the reserved resource selected by the own terminal and the reserved resource of the other terminal device, the transmission terminals Tx #1 and #2 reselect a reserved resource for the own terminal.

The reception terminals Rx #1 to #4 receive the SCI transmitted from the transmission terminals Tx #1 and #2, and specify the reserved resources of the transmission terminals Tx #1 and #2. Then, the reception terminals Rx #1 to #4 receive signals transmitted from the transmission terminals Tx #1 and #2 in the respective reserved resources of the transmission terminals Tx #1 and #2, and decode the received signals. The reception terminals Rx #1 to #4 may transmit feedback information such as ACK or NACK, for example, to the transmission terminals Tx #1 and Tx #2, depending on whether the received signals are successfully decoded.

The coordinative terminal Co receives the SCI transmitted from the transmission terminals Tx #1 and #2, and specifies the reserved resources of the transmission terminals Tx #1 and #2. The coordinative terminal Co then determines whether there is a conflict occurring in the reserved resources of the transmission terminals Tx #1 and #2 and, when there is a conflict in the reserved resources, determines whether to have the transmission terminals Tx #1 and #2 reselect the resources. Specifically, the coordinative terminal Co calculates, for example, the risk of having data errors occurring when the transmission terminals Tx #1 and #2 transmit data using the reserved resources (hereinafter referred to as "error risk") based on the proportion of overlapping area of the conflicting reserved resources. Then, when the error risk is equal to or greater than a prescribed threshold, the coordinative terminal Co determines to have the transmission terminal Tx #1 or the transmission terminal Tx #2 reselect the resource and requests reselection of the resource. The configuration and operation of the coordinative terminal Co will be described in detail later.

Figure 2:
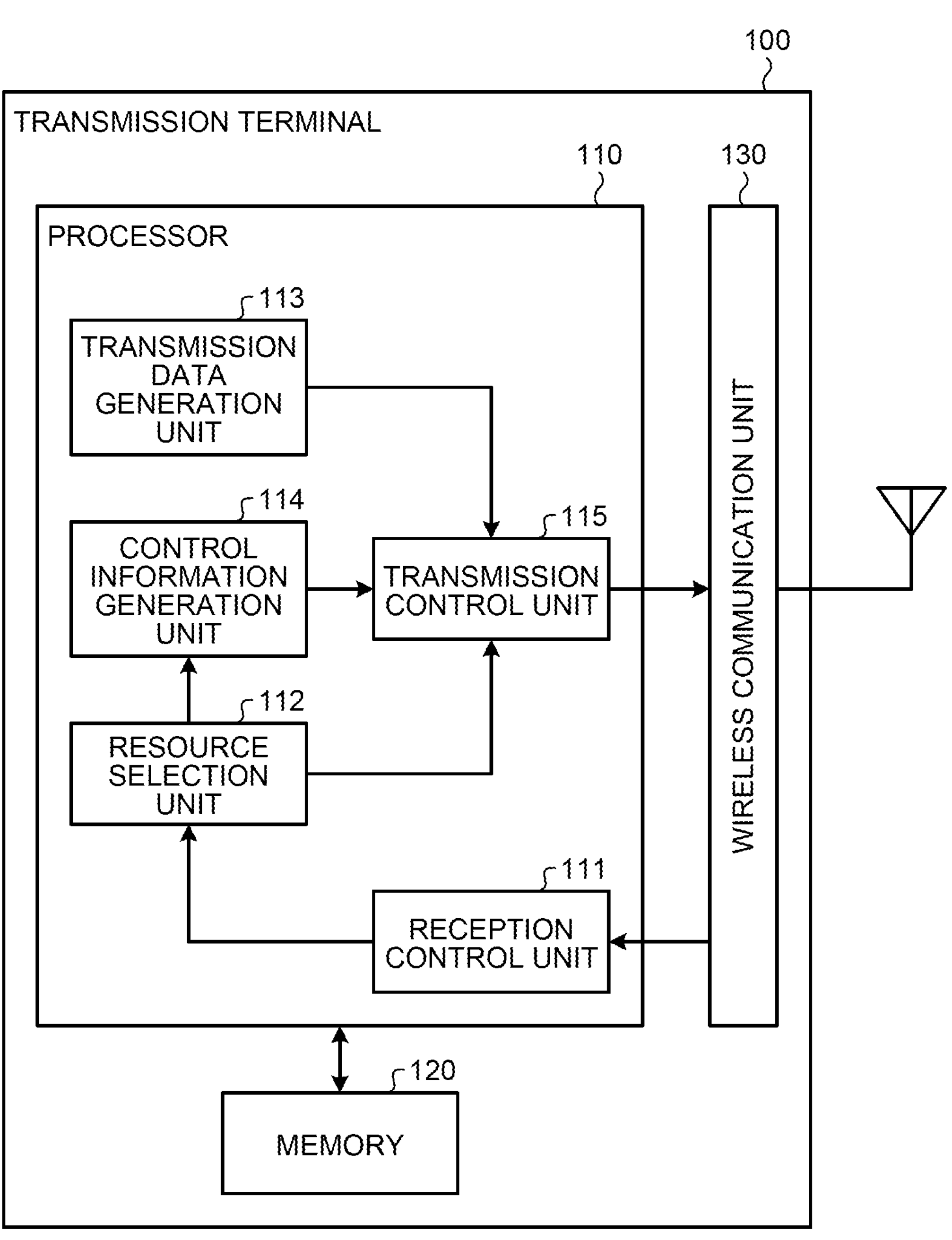
FIG. 2 is a block diagram illustrating a configuration of a transmission terminal according to the first embodiment.

FIG. 2 is a block diagram illustrating a configuration of a transmission terminal 100 according to the first embodiment. The transmission terminal 100 illustrated in FIG. 2 corresponds to the transmission terminals Tx #1 and #2 illustrated in FIG. 1. As illustrated in FIG. 2, the transmission terminal 100 includes a processor 110, a memory 120, and a wireless communication unit 130.

The processor 110 includes a central processing unit (CPU), a field programmable gate array (FPGA) or a digital signal processor (DSP), for example, and executes overall control of the transmission terminal 100. Specifically, the processor 110 includes a reception control unit 111, a resource selection unit 112, a transmission data generation unit 113, a control information generation unit 114, and a transmission control unit 115.

The reception control unit 111 demodulates and decodes received signals at the wireless communication unit 130, acquires control information such as SCI from a control channel such as PSCCH, for example, and acquires data from a data channel such as PSSCH, for example. At this time, based on the decoding results of the SCI, the reception control unit 111 specifies the reserved resource to be used as the data channel by the other terminal device. The reception control unit 111 then executes demodulation and decoding of the data channel of the other terminal device to acquire data. Furthermore, upon receiving a resource reselection request from the coordinative terminal, the reception control unit 111 notifies it to the resource selection unit 112.

The resource selection unit 112 selects a resource to be used by the transmission terminal 100 to transmit data based on the reserved resource of the other terminal device specified by the reception control unit 111. Specifically, the resource selection unit 112 selects a resource that does not overlap with the reserved resource of the other terminal device as a reserved resource of the transmission terminal 100. The resource selection unit 112 notifies the selected reserved resource to the control information generation unit 114 and the transmission control unit 115.

Furthermore, the resource selection unit 112 executes reselection of the reserved resource, when a resource reselection request is received at the reception control unit 111. In other words, the resource selection unit 112 reselects a resource that does not overlap with the reserved resource of the other terminal device and is different from the previously selected reserved resource. The resource selection unit 112 notifies the reselected reserved resource to the control information generation unit 114 and the transmission control unit 115.

The transmission data generation unit 113 generates data to be transmitted to the other terminal devices. The transmission data generation unit 113 generates data that is transmitted by either unicast, groupcast, or broadcast.

The control information generation unit 114 generates control information regarding the data to be transmitted to the other terminal devices. Specifically, the control information generation unit 114 generates SCI that contains information for specifying the reserved resource selected by the resource selection unit 112, and the like. The control information generation unit 114 also generates SCI that contains information on the Modulation and Coding Scheme (MCS) of the transmission data, and the like.

The transmission control unit 115 causes the wireless communication unit 130 to transmit SCI containing information for specifying the reserved resource by using a prescribed control channel. Furthermore, the transmission control unit 115 causes the wireless communication unit 130 to transmit transmission data by using the reserved resource selected by the resource selection unit 112.

The memory 120 includes a Random Access Memory (RAM) or a Read Only Memory (ROM), and the like, for example, and stores information used for processing performed by the processor 110.

The wireless communication unit 130 executes wireless communication with the other terminal devices. In other words, the wireless communication unit 130 performs prescribed wireless transmission processing on transmission signals output from the processor 110, and transmits the signals to the other terminal devices via an antenna. Furthermore, the wireless communication unit 130 receives signals from the other terminal devices via the antenna, performs prescribed wireless reception processing on the received signals, and outputs the received signals to the processor 110.

Figure 3:
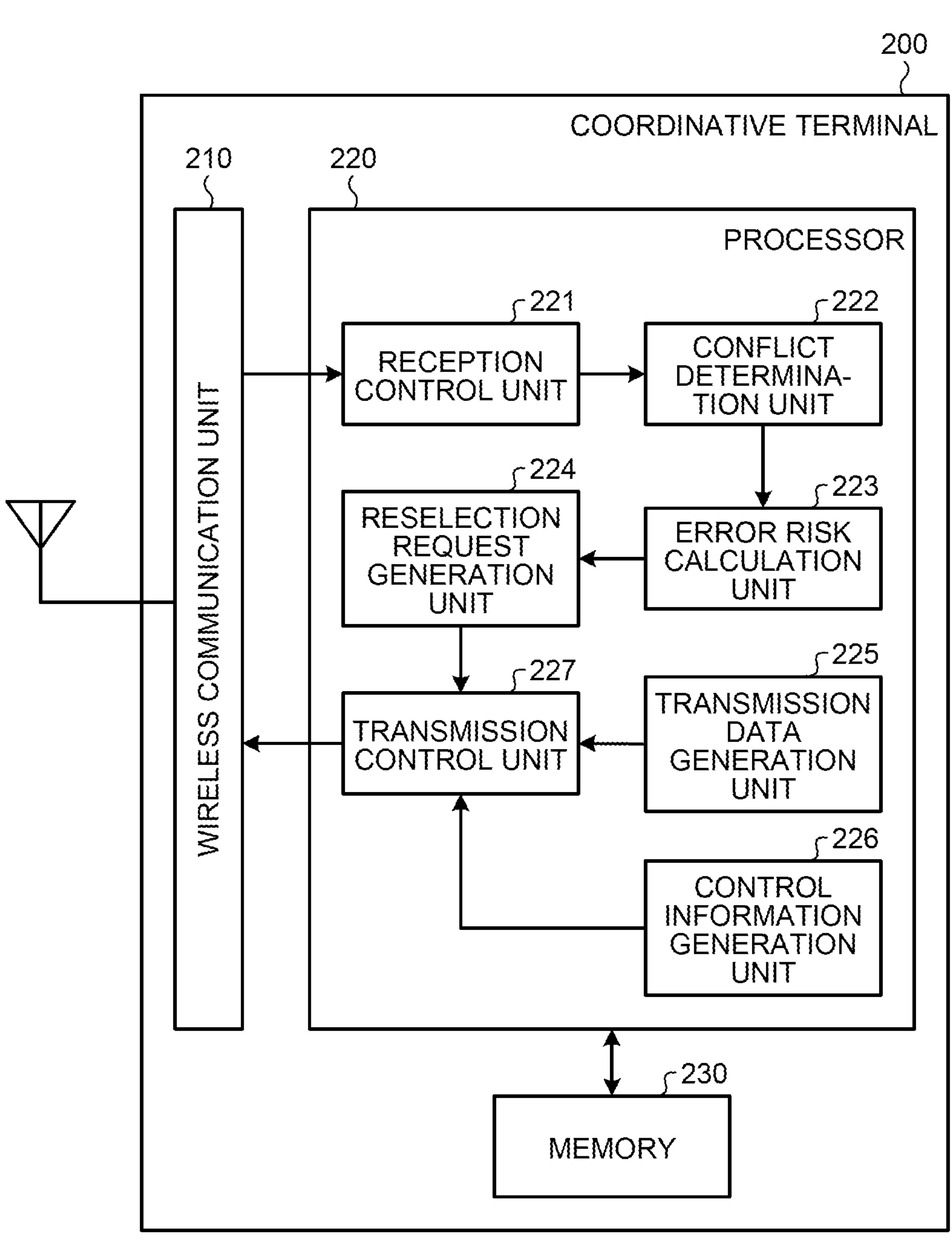
FIG. 3 is a block diagram illustrating a configuration of a coordinative terminal according to the first embodiment.

FIG. 3 is a block diagram illustrating a configuration of a coordinative terminal 200 according to the first embodiment. The coordinative terminal 200 illustrated in FIG. 3 corresponds to the coordinative terminal Co illustrated in FIG. 1. As illustrated in FIG. 3, the coordinative terminal 200 includes a wireless communication unit 210, a processor 220, and a memory 230.

The wireless communication unit 210 executes wireless communication with the other terminal devices. In other words, the wireless communication unit 210 receives signals from the transmission terminal 100 via an antenna, performs the prescribed wireless reception processing on the received signals, and outputs the received signals to the processor 220. Furthermore, the wireless communication unit 210 performs prescribed wireless transmission processing on transmission signals output from the processor 220, and transmits the signals to the other terminal devices via the antenna.

The processor 220 includes a CPU, an FPGA, or a DSP, for example, and performs overall control of the coordinative terminal 200. Specifically, the processor 220 includes a reception control unit 221, a conflict determination unit 222, an error risk calculation unit 223, a reselection request generation unit 224, a transmission data generation unit 225, a control information generation unit 226, and a transmission control unit 227.

The reception control unit 221 demodulates and decodes received signals at the wireless communication unit 210, acquires control information such as SCI from a control channel such as PSCCH, for example, and acquires data from a data channel such as PSSCH, for example. At this time, based on the decoding result of the SCI, the reception control unit 221 specifies the reserved resource to be used as the data channel by the transmission terminal 100. The reception control unit 221 then executes demodulation and decoding of the data channel of the transmission terminal 100 to acquire data.

The conflict determination unit 222 determines whether a conflict occurs in the reserved resources of a plurality of transmission terminals 100 based on the SCI acquired by the reception control unit 221. Specifically, the conflict determination unit 222 determines whether the reserved resources of the transmission terminals 100 overlap in the time and frequency from the SCI containing the information for specifying the reserved resources of the transmission terminals 100. When the time and frequency of the reserved resources of the transmission terminals 100 overlap, the conflict determination unit 222 determines that a conflict of the reserved resources occurs.

The error risk calculation unit 223 calculates the error risk of data transmission using the conflicting reserved resources, when it is determined by the conflict determination unit 222 that a conflict of the reserved resources occurs. In other words, the error risk calculation unit 223 calculates the error risk of having errors occurring in the transmitted data, when the transmission terminals 100 transmit data using the overlapping reserved resources. Specifically, the error risk calculation unit 223 calculates, as the error risk, the overlap ratio of reserved resources calculated by the Following formula (1), for example.

$$\text{Overlap ratio}=\text{Overlapping area}/\text{Min}\{\text{occupied area per transmission terminal}\} \quad (1)$$

Note that, in Formula (1), Min{A} denotes the minimum value of a set A. Therefore, the overlap ratio is the proportion of the area overlapping with the reserved resource of the other transmission terminal 100 occupying the reserved resource of the transmission terminal 100 with the smallest occupied area of the reserved resource. Note that the error risk calculation unit 223 may calculate the overlap ratio of each of the transmission terminals 100 as the error risk for each of the transmission terminals 100 using the following Formula (2), for example.

$$\text{Overlap ratio}=\text{Overlapping area}/\text{Occupied area per transmission terminal} \quad (2)$$

While the Formula (1) calculates the error risk for each overlapping area of the reserved resources, the Formula (2) calculates the error risk for each of the transmission terminals 100. When the proportion of the overlapping areas occupying the reserved resource is large, the data transmitted by using the reserved resource is more likely to have errors. Thus, the overlap ratio calculated by the Formulae (1) and (2) can be used as the data error risk. The error risk calculation unit 223 may also calculate the error risk by taking into account the information on the MCS for each of the transmission terminals 100 in addition to the overlap ratio of the Formulae (1) and (2). In short, the error risk calculation unit 223 calculates the error risk that indicates the possibility of having errors in the data when transmitted by using a conflicting reserved resource.

Then, the error risk calculation unit 223 compares the calculated error risk with a prescribed threshold to determine whether to have the transmission terminals 100 whose reserved resources conflict to reselect the resources. In other words, when the error risk is equal to or greater than the prescribed threshold, the error risk calculation unit 223 determines to have the transmission terminals 100 reselect the resources. At this time, when calculating the error risk for each of the overlapping areas as in the Formula (1), for example, the error risk calculation unit 223 may determine to have the transmission terminal 100 with the smallest occupied area of the reserved resource reselect the resource. Furthermore, when calculating the error risk for each of the transmission terminals as in the Formula (2), for example, the error risk calculation unit 223 may determine to have the transmission terminal 100 whose error risk is equal to or greater than the prescribed threshold reselect the resource.

The reselection request generation unit 224 generates a reselection request for requesting reselection of the resource, when it is determined by the error risk calculation unit 223 to have the transmission terminal 100 reselect the resource. The reselection request generation unit 224 generates a reselection request addressed to the transmission terminal 100 that is determined by the error risk calculation unit 223 to reselect the resource.

The transmission data generation unit 225 generates data to be transmitted to the other terminal devices. In other words, the transmission data generation unit 225 generates data that is transmitted by either unicast, groupcast, or broadcast, when the coordinative terminal 200 is the transmission terminal.

The control information generation unit 226 generates control information regarding the data to be transmitted to the other terminal devices. In other words, the control information generation unit 226 generates control information such as SCI, when the coordinative terminal 200 is the transmission terminal.

The transmission control unit 227 causes the wireless communication unit 210 to transmit the reselection request generated by the reselection request generation unit 224 to the transmission terminal 100 by using a Physical Sidelink Feedback CHannel (PSFCH) for giving feedback of ACK, NACK, or the like, for example. Furthermore, when the coordinative terminal 200 is the transmission terminal, the transmission control unit 227 causes the wireless communication unit 210 to transmit transmission data and control information.

The memory 230 includes a RAM or a ROM, and the like, for example, and stores information used for processing performed by the processor 220.

Figure 4:
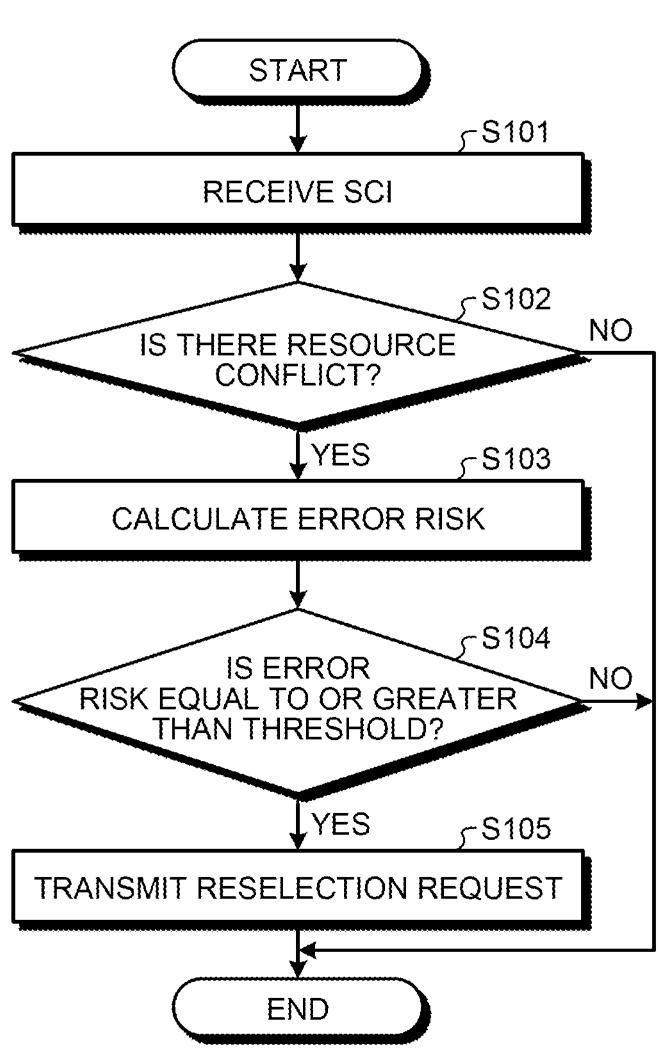
FIG. 4 is a flowchart illustrating a communication control method according to the first embodiment.

Next, a communication control method performed by the coordinative terminal 200 configured as described above will be explained with reference to the flowchart illustrated in FIG. 4.

When the SCI containing information for specifying the respective reserved resource is received from the transmission terminals 100 by the wireless communication unit 210 and the reception control unit 221 (step S101), the reserved resources of each of the transmission terminals 100 are notified to the conflict determination unit 222. Then, it is determined by the conflict determination unit 222 whether a conflict of reserved resources occurs for each of the transmission terminals 100 (step S102). Specifically, it is determined whether the time and frequency of the reserved resources of the transmission terminals 100 overlap. When found as a result of this determination that the time and frequency of the reserved resources do not overlap and no conflict occurs (No at step S102), the processing ends since there is no need for the transmission terminals 100 to reselect the resources.

On the other hand, when the time and frequency of the reserved resources overlap and a conflict occurs (Yes at step S102), the error risk calculation unit 223 calculates the error risk for the conflicting reserved resources (step S103). Specifically, for example, the overlap ratio of the reserved resources indicated in the Formulae (1) and (2), for example, is calculated as the error risk. Then, the error risk calculation unit 223 determines whether the calculated error risk is equal to greater than the prescribed threshold (step S104). When found as s a result of the determination that the error risk is less than the prescribed threshold (No at step S104), it is determined that there is no need to reselect the resources since the error risk is low even if a conflict of the reserved resources occurs, thereby ending the processing.

On the other hand, when the error risk is equal to or greater than the prescribed threshold (Yes at step S104), it is determined that there is a need to reselect the resources since the possibility of having errors in the data due to the conflict of the reserved resources is high. Thus, a reselection request for requesting reselection of the resource is generated by the reselection request generation unit 224, and the reselection request is transmitted to the transmission terminal 100 by the transmission control unit 227 and the wireless communication unit 210 (step S105). Out of the transmission terminals 100 with the conflicting reserved resources, the reselection request is transmitted to the transmission terminal 100 with the smallest reserved resource or to the transmission terminal 100 whose error risk is equal to or greater than the prescribed threshold. Note that the destination of the reselection request may be determined such that the error risk becomes less than the prescribed threshold by reselecting the resource.

As described, when a conflict occurs in the reserved resources of the transmission terminals 100, the coordinative terminal 200 calculates the error risk, determines whether to have reselection of the resource by the transmission terminal 100, and transmits a resource reselection request to the transmission terminal 100 when the error risk is high. This can suppress unnecessary reselection of resources and reduce the possibility of having a re-conflict in the reserved resources caused due to reselection. As a result, the communication efficiency in the wireless communication system can be improved.

Figure 5:
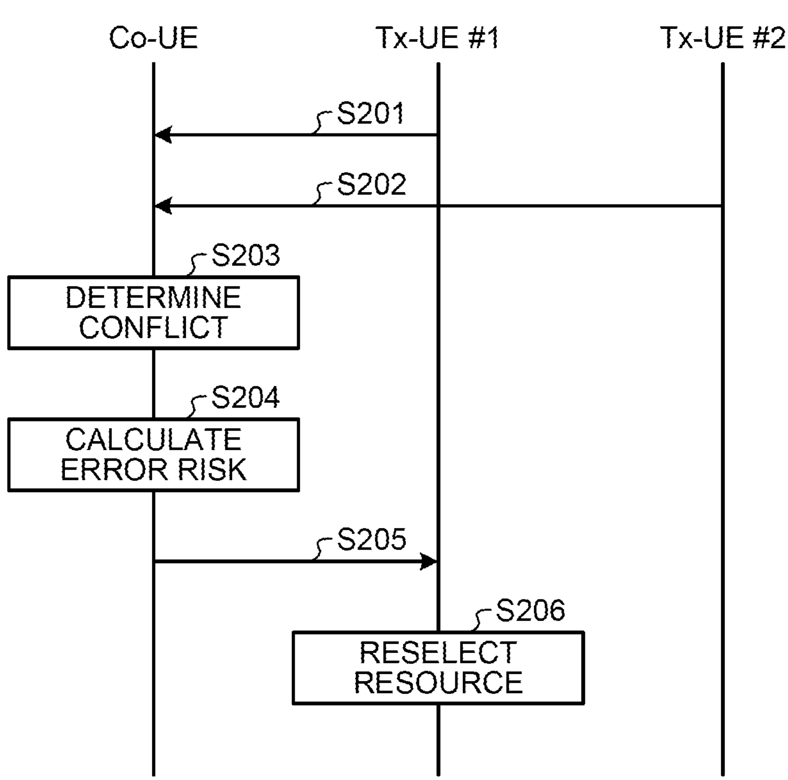
FIG. 5 is a sequence chart illustrating resource reselection processing.

Next, the resource reselection processing will be explained by referring to a specific example with reference to the sequence chart illustrated in FIG. 5. In the following, a case in which there is a conflict in the reserved resources selected by the transmission terminals Tx #1 and #2 will be explained. In FIG. 5, the transmission terminals Tx #1 and #2 are denoted as Tx-UE #1 and Tx-UE #2, respectively, and the coordinative terminal Co is denoted as Co-UE.

The transmission terminals Tx #1 and #2 select the reserved resource to be used by the own devices for data transmission based on the SCI already received from the other terminal device. In other words, the transmission terminals Tx #1 and #2 select the resource that does not overlap with the reserved resource of the other terminal device in the time or frequency as the reserved resource of the own device. Note here that, in a case where the transmission terminals Tx #1 and #2 select the reserved resources almost simultaneously, for example, the SCI is not received from each other. Thus, the transmission terminals Tx #1 and Tx #2 may select reserved resources with overlapping time and frequency. In other words, the reserved resources of the transmission terminals Tx #1 and #2 may conflict. Herein, the explanation will be continued assuming that there is a conflict occurring in the reserved resources of the transmission terminals Tx #1 and #2.

Upon selecting a respective reserved resource, each of the transmission terminals Tx #1 and #2 transmits SCI containing information for specifying the reserved resource (steps S201 and S202). The SCI is received by the terminal devices within the group including the coordinative terminal Co. Upon receiving the SCI from the transmission terminals Tx #1 and #2, the coordinative terminal Co determines whether the reserved resources of the transmission terminals Tx #1 and #2 conflict (step S203). In other words, the coordinative terminal Co determines whether the time and frequency of the reserved resources of the transmission terminals Tx #1 and #2 overlap. Herein, it is determined that a conflict in the reserved resources of the transmission terminals Tx #1 and #2 occurs.

Since a conflict of the reserved resources occurs, the coordinative terminal Co calculates the error risk that may be caused when the transmission terminals Tx #1 and #2 transmit data by using the reserved resources (step S204). Specifically, the coordinative terminal Co calculates the overlap ratio (Formula (1)) occupied by the overlapping area in the smaller reserved resource out of the reserved resources of the transmission terminals Tx #1 and #2 as the error risk, or calculates the overlap ratio (Formula (2)) for each of the transmission terminals occupied by the overlapping area in each of the reserved resources of the transmission terminals Tx #1 and #2 as the error risk. Instead of using the overlap ratio as-is as the error risk, the coordinative terminal Co may calculate the error risk by taking into account the information of the MCS applied to the data that is transmitted by using the reserved resource in addition to the overlap ratio.

When the calculated error risk is equal to or greater than the prescribed threshold, the coordinative terminal Co determines to have one of the transmission terminals #1 and #2 reselect the resource, since the possibility of having errors in the data transmitted by the transmission terminals #1 and #2 by using the reserved resource is high. Herein, it is assumed that the error risk is equal to or greater than the prescribed threshold, and determined to have the transmission terminal Tx #1 that is the transmission terminal with a smaller reserved resource or the transmission terminal with a greater error risk reselect the resource.

When determined to have the resource reselected, the coordinative terminal Co transmits a reselection request to the transmission terminal Tx #1 (step S205). The transmission terminal Tx #1 upon receiving the reselection request reselects a resource that does not overlap with the reserved resource of the other terminal device in the time or frequency and is also different from the reserved resource notified by the SCI at step S201 (step S206). Thereby, when the reserved resources initially selected by the transmission terminals Tx #1 and #2 conflict and the error risk is high, the transmission terminal Tx #1 reselects the resource to avoid the conflict in the reserved resources of the transmission terminals Tx #1 and #2.

Figure 6A:
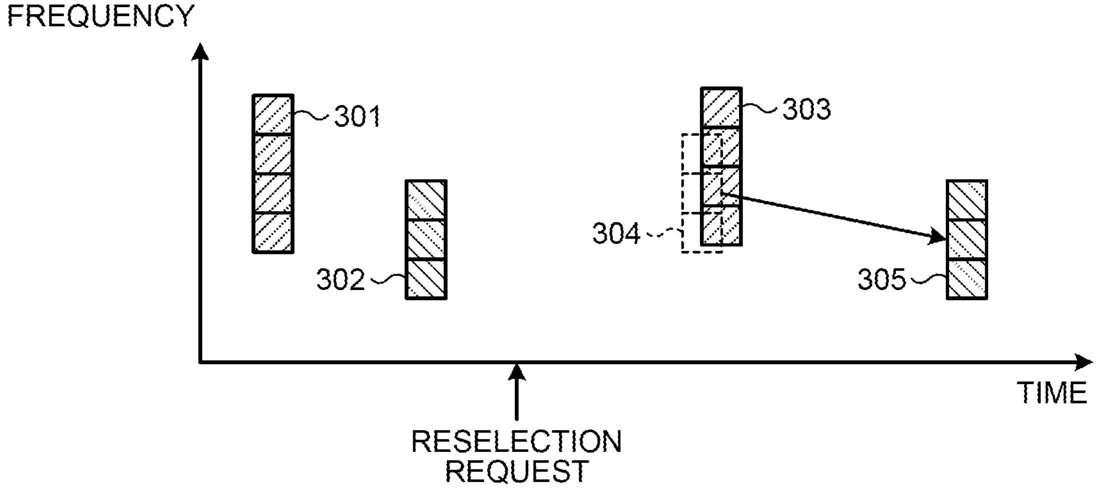
FIGS. 6A and 6B are graphs for describing specific examples of the resource reselection processing.

Specifically, as illustrated in FIG. 6A, for example, a case will be discussed in which the transmission terminal Tx #2 notifies a reserved resource 303 by SCI 301, and the transmission terminal Tx #1 notifies a reserved resource 304 by SCI 302. In this case, upon receiving the SCI 301 and the SCI 302, the coordinative terminal Co determines that the reserved resources 303 and 304 conflict, and calculates the error risk. In the example indicated in FIG. 6A, the entire reserved resource 304 overlaps with the reserved resource 303 and the error risk is equal to or greater than the prescribed threshold. Therefore, the coordinative terminal Co, before the timing for the reserved resources 303 and 304 arrives, transmits a resource reselection request to the transmission terminal Tx #1 that corresponds to the reserved resource 304. Thereby, the transmission terminal Tx #1 reselects a resource 305 that is different from the reserved resource 304, and transmits data by using the new reserved resource 305. As described, when the error risk due to the conflicting reserved resources is high, resource reselection is executed to avoid the conflict in the reserved resources.

Figure 6B:
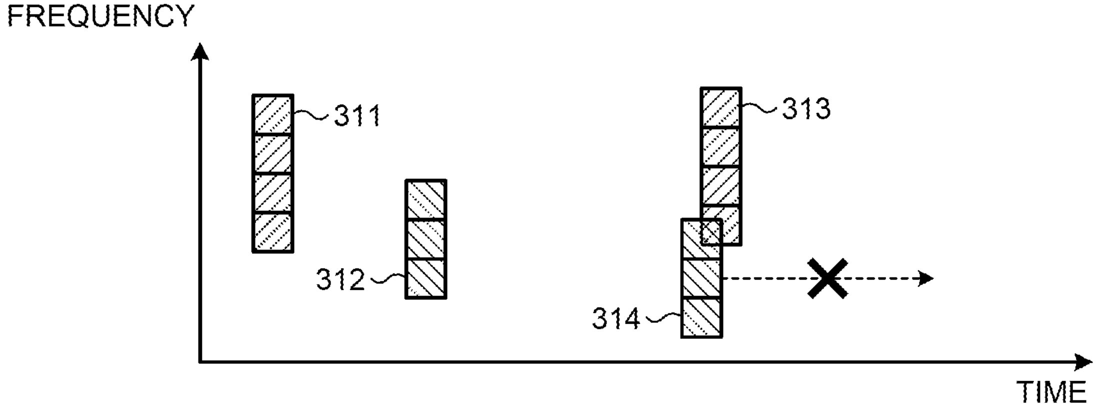

On the other hand, as illustrated in FIG. 6B, for example, a case will be discussed in which the transmission terminal Tx #2 notifies a reserved resource 313 by SCI 311, and the transmission terminal Tx #1 notifies a reserved resource 314 by SCI 312. In this case, upon receiving the SCI 311 and the SCI 312, the coordinative terminal Co determines that the reserved resources 313 and 314 conflict, and calculates the error risk. In the example indicated in FIG. 6B, the coordinative terminal Co determines that there is no need to reselect the resource since the proportion of the overlapping areas is small for both reserved resources 313, 314 and the error risk is less than the prescribed threshold. Therefore, the transmission terminals Tx #1 and #2 do not reselect the resources even if the reserved resources 313 and 314 conflict, and transmit data using the reserved resources 313 and 314. Therefore, even though part of the data transmitted by the transmission terminals Tx #1 and #2 is transmitted in the overlapping areas of the reserved resources 313 and 314, the proportion thereof is small. Thus, there is a small possibility that the respective transmitted data is received erroneously is small. In addition, since unnecessary reselection of the reserved resources 313 and 314 does not occur, the possibility of having re-conflict of the resources caused due to reselection can be reduced, thereby making it possible to improve the communication efficiency.

As described above, according to the present embodiment, when it is determined that a conflict of the reserved resources of the transmission terminals occurs, the coordinative terminal calculates the error risk of having errors in the data due to the conflict of the reserved resources, and requests reselection of the resource when the error risk is equal to or greater than the prescribed threshold. Therefore, when the conflict of the reserved resources occurs but the error risk is low, reselection of the resource by the transmission terminal is not executed. Thus, unnecessary reselection of the resources can be suppressed, thereby making it possible to reduce the possibility of having a re-conflict of the reserved resources caused due to reselection. As a result, the communication efficiency in the wireless communication system can be improved.

(b) Second Embodiment

It is a feature of a second embodiment to determine whether to request resource reselection to each of the transmission terminals according to a prescribed rule, when a conflict occurs in the reserved resources of the transmission terminals.

Since the configuration of the wireless communication system according to the second embodiment is the same as that of the first embodiment (FIG. 1), explanation thereof is omitted. Furthermore, since the configuration of the transmission terminal 100 according to the second embodiment is the same as that of the first embodiment (FIG. 2), explanation thereof is omitted.

Figure 7:
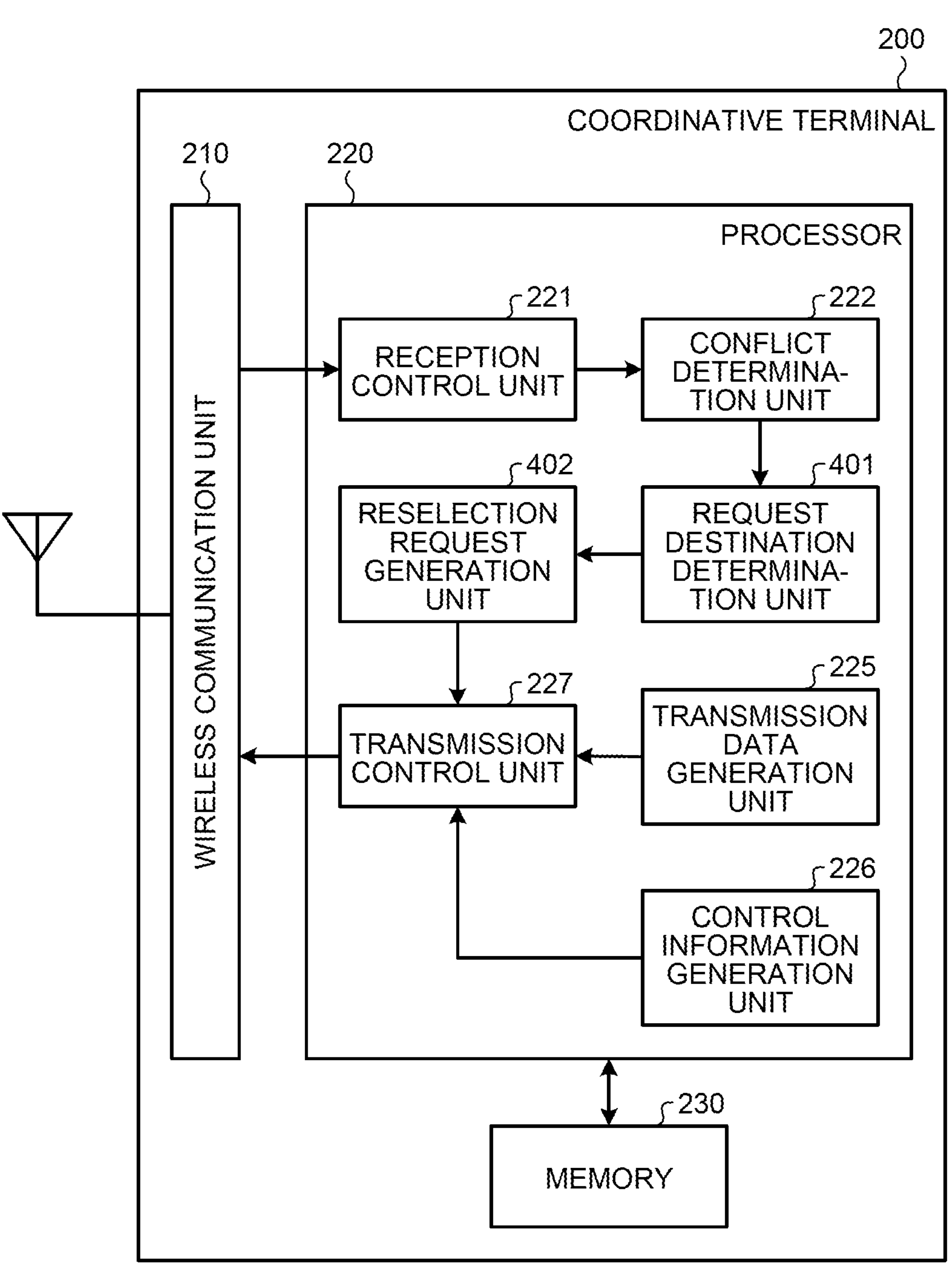
FIG. 7 is a block diagram illustrating a configuration of a coordinative terminal according to a second embodiment.

FIG. 7 is a block diagram illustrating the configuration of the coordinative terminal 200 according to the second embodiment. In FIG. 7, same reference signs are applied to the same structural components as those of FIG. 3, and explanation thereof is omitted. The coordinative terminal 200 illustrated in FIG. 7 includes a request destination determination unit 401 and a reselection request generation unit 402 instead of the error risk calculation unit 223 and the reselection request generation unit 224 of the coordinative terminal 200 illustrated in FIG. 3.

The request destination determination unit 401 determines the transmission terminal 100 as the request destination for requesting reselection of the resource, when it is determined by the conflict determination unit 222 that a conflict of the reserved resources occurs. In other words, out of the transmission terminals 100 having the conflicting reserved resources, the request destination determination unit 401 determines the transmission terminal 100 to request reselection of the resource, and the transmission terminal 100 not to request reselection of the resource. Specifically, the request destination determination unit 401 determines the transmission terminal 100 to request reselection of the resource according to one of or a plurality of the following rules (A) to (E).

(A) Data Priority

When the priority of data is designated by the SCI that contains information for specifying the reserved resource, the request destination determination unit 401 determines the transmission terminal 100 that transmits data with a lower priority as the destination of a resource reselection request. This makes it possible to avoid a conflict and a re-conflict of the reserved resource for transmitting data with a high priority.

(B) Reception Timing of SCI

The request destination determination unit 401 determines, as the destination of a resource reselection request, the transmission terminal 100 whose reception timing of SCI containing information for specifying the reserved resource is early or the transmission terminal 100 whose reception timing is late.

(C) Size of Occupied Area of Reserved Resource

The request destination determination unit 401 determines, as the destination of a resource reselection request, the transmission terminal 100 with a small occupied area of the reserved resource. With the reserved resource with a small occupied area, the possibility of having a re-conflict can be reduced even when the resource is reselected.

(D) Use Probability of Reserved Resource

The request destination determination unit 401 determines, as the destination of a resource reselection request, the transmission terminal 100 with a low probability of actually using the reserved resource for data transmission. For example, in regards to the initial transmission data and retransmission data, actually transmission of the retransmission data does not always executed, since retransmission is not executed if the initial transmission data is received properly. Therefore, between the transmission terminal 100 that transmits the initial transmission data and the transmission terminal 100 that transmits the retransmission data, the transmission terminal 100 that transmits the retransmission data has a lower probability of actually using the reserved resource. In addition, the more the number of retransmissions, the lower the probability that the retransmission data is actually transmitted. Thus, the more the number of retransmissions, the lower the probability that the reserved resource is actually used. Therefore, by having the transmission terminal 100 scheduled to transmit data with a large number of retransmissions reselect the resource, the possibility of actually having a re-conflict of the reserved resources can be reduced.

(E) Data Transmission Period

The request destination determination unit 401 determines, as the destination of a resource reselection request, the transmission terminal 100 that transmits data that is transmitted aperiodically. Between data transmitted periodically and data transmitted aperiodically, data transmitted periodically is more likely to have the reserved resource specified by a greater number of terminal devices. This is because the reserved resources for the data transmitted periodically are also periodic. Therefore, by not changing the reserved resource for the data transmitted periodically and changing the reserved resource for the data transmitted aperiodically, a conflict and a re-conflict of the reserved resource for the data transmitted periodically can be avoided.

By applying one of or a combination of the above rules (A) to (E), the request destination determination unit 401 determines whether to have reselection of the resources by the transmission terminals 100 having conflicting resources. In other words, the request destination determination unit 401 determines to have one of the transmission terminals 100 reselect the resource and determines not to have any of the other transmission terminals 100 reselect the resource according to the rules.

The reselection request generation unit 402 generates a reselection request for requesting reselection of the resource addressed to the transmission terminal 100 that is determined by the request destination determination unit 401 to be the request destination.

Figure 8:
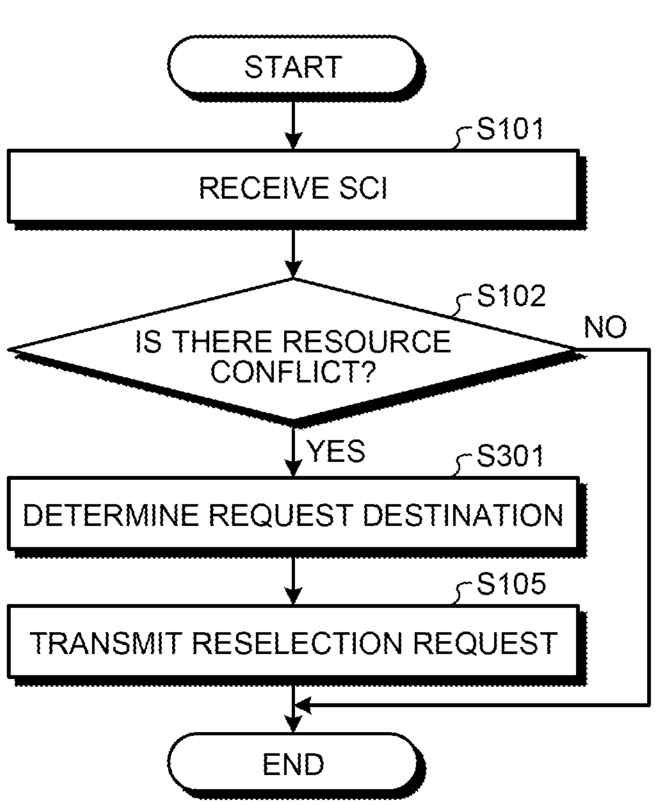
FIG. 8 is a flowchart illustrating a communication control method according to the second embodiment.

Next, a communication control method by the coordinative terminal 200 configured as described above will be explained with reference to the flowchart illustrated in FIG. 8. In FIG. 8, same reference signs are applied to the same structural components as those of FIG. 4, and detailed explanation thereof is omitted.

When the SCI containing information for specifying the respective reserved resource is received from the transmission terminals 100 by the wireless communication unit 210 and the reception control unit 221 (step S101), the reserved resources of each of the transmission terminals 100 are notified to the conflict determination unit 222. Then, it is determined by the conflict determination unit 222 whether a conflict of reserved resources occurs for each of the transmission terminals 100 (step S102). When found as a result of this determination that no conflict occurs in the reserved resources (No at step S102), the processing ends since there is no need for the transmission terminals 100 to reselect the resources.

On the other hand, when a conflict of the reserved resources occurs (Yes at step S102), the request destination determination unit 401 determines the transmission terminal 100 as the request destination to request reselection of the resource (step S301). Specifically, by applying one of or a combination of the above rules (A) to (E), for example, the transmission terminal 100 to reselect the resource is determined. At this time, in a case where reserved resources of three or more transmission terminals 100 conflict, for example, two or more transmission terminals 100 may be determined as the request destination transmission terminal 100 according to the rules (A) to (E) described above to solve the conflict of the reserved resources.

When the transmission terminal 100 to be the request destination is determined, a reselection request for requesting reselection of the resource is generated by the reselection request generation unit 402, and it is transmitted to the transmission terminal 100 as the request destination by the transmission control unit 227 and the wireless communication unit 210 (step S105).

As described, when a conflict occurs in the reserved resources of the transmission terminals 100, the coordinative terminal 200 determines the transmission terminal 100 as the request destination for requesting reselection of the resource to determine whether to have reselection of the resource by the transmission terminal 100, and transmits a resource reselection request to the transmission terminal 100 as the request destination. Thereby, even in a case where a plurality of the coordinative terminals 200 request reselection of the resource to the transmission terminal 100, reselection is requested to a common transmission terminal 100. Thus, it is possible to suppress unnecessary reselection of the resource and reduce the possibility of having a re-conflict in the reserved resources caused due to reselection. As a result, the communication efficiency in the wireless communication system can be improved.

As described above, according to the present embodiment, when it is determined that a conflict occurs in the reserved resources of the transmission terminals, the coordinative terminal determines the transmission terminal as the request destination for requesting reselection of the resource according to the rules, and requests reselection of the resource to the transmission terminal determined as the request destination. Therefore, even in a case where the coordinative terminals request reselection of the resource, reselection is requested to a common transmission terminal. Thus, it is possible to suppress unnecessary reselection of the resource and reduce the possibility of having a re-conflict in the reserved resources caused due to reselection. As a result, the communication efficiency in the wireless communication system can be improved.

Each of the embodiments described above can be implemented in combination as appropriate. That is, for example, the error risk may be calculated to determine whether to have reselection of the resource as in the first embodiment, and the request destination of reselection of the resource may be determined as in the second embodiment.

According to one aspect of the wireless communication device, wireless communication system, and communication control method disclosed herein, it is possible to improve the communication efficiency.

All examples and conditional language recited herein are intended for pedagogical purposes of aiding the reader in understanding the disclosure and the concepts contributed by the inventors to further the art, and are not to be construed as limitations to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. A wireless communication device comprising:

a wireless communicator configured to perform wireless communication with a plurality of transmission terminals; and processor circuitry is further configured to:

determine whether a conflict occurs in wireless resources reserved by the transmission terminals to be used for data transmission, determine, when it is determined that a conflict of the wireless resources occurs, for transmitting information for requesting a reselection of the wireless resource, determine, out of the plurality of the transmission terminals, a first transmission terminal for transmitting the information, and determine, out of the plurality of the transmission terminals, a second transmission terminal for not transmitting the information, wherein the first transmission terminal is determined based on rules established according to a priority of data transmitted using the reserved wireless resource, a reception timing of control information notifying the reserved wireless resource and an occupied area of the reserved wireless resource.

2. The wireless communication device according to claim 1, wherein the processor circuitry is further configured to:

calculate an error risk that indicates a possibility of having an error in data, when data is transmitted by using conflicting wireless resources, and when the calculated error risk is equal to or greater than a prescribed threshold, determine for transmitting the information for requesting the reselection of the wireless resource.

3. The wireless communication device according to claim 2, wherein the processor circuitry is further configured to calculate the error risk based on a proportion of an area overlapping with a wireless resource reserved by another transmission terminal occupying an occupied area of a wireless resource reserved by each of the transmission terminals.

4. The wireless communication device according to claim 3, wherein the processor circuitry is further configured to calculate the error risk based on Modulation and Coding Scheme (MCS) of the data transmitted by using the wireless resource reserved by each of the transmission terminals.

5. The wireless communication device according to claim 1, wherein the processor circuitry is further configured to cause the transmission terminal that received the information determined to be transmitted by the processor circuitry, to reselect the wireless resource according to the rule based on the priority of the data transmitted by using the reserved wireless resource, the reception timing of control information that notifies the reserved wireless resource, the occupied area of the reserved wireless resource, or a transmission period of the data transmitted by using the reserved wireless resource, or any combination thereof.

6. The wireless communication device according to claim 1, wherein the wireless communicator is further configured to transmit the information for requesting the reselection of the wireless resource by using a feedback channel that is for transmitting feedback information.

7. The wireless communication device according to claim 1, wherein the information for requesting the reselection of the wireless resource is information that cause a transmission terminal received the information to reselect the wireless resource.

8. A transmission terminal in a plurality of transmission terminals communicating with wireless communication device, the transmission terminal comprising:

a transmitter configured to transmit, to the wireless communication device, information indicating a first wireless resource to reserve for use in data transmission;

a receiver configured to receive, from the wireless communication device, information for requesting a reselection of the wireless resource, when the wireless communication device detects a conflict of the first wireless resource and a second wireless resource reserved by the other transmission terminal in the plurality of transmission terminals, and determines a first transmission terminal for transmitting the information and a second transmission terminal for not transmitting the information based on rules established according to a priority of data transmitted using the reserved wireless resource, a reception timing of control information notifying the reserved wireless resource and an occupied area of the reserved wireless resource; and processor circuitry configured to select a third wireless resource different from the first wireless resource according the reception of the information for requesting the reselection of the wireless resource.

9. A wireless communication system comprising:

a first terminal device;

a second terminal device; and a third terminal device, wherein the first terminal device and the second terminal device include a transmitter configured to transmit control information for specifying a wireless resource reserved to be used for data transmission, the third terminal device includes, a wireless communicator configured to perform wireless communication with the first terminal device and the second terminal device, and processor circuitry configured to:

determine whether a conflict occurs in the wireless resources reserved by the first terminal device and the second terminal device, based on the control information received by the wireless communicator, determine, when it is determined that a conflict of the wireless resources occurs, for transmitting information for requesting a reselection of the wireless resource, determine, out of the first transmission terminal and the second transmission terminal, the first transmission terminal for transmitting the information, and determine, out of the first transmission terminal and the second transmission terminal, the second transmission terminal for not transmitting the information, wherein the first transmission terminal is determined based on rules established according to a priority of data transmitted using the reserved wireless resource, a reception timing of control information notifying the reserved wireless resource and an occupied area of the reserved wireless resource.

* * * * *